United States Patent
Duncan et al.

(10) Patent No.: US 9,135,340 B2
(45) Date of Patent: Sep. 15, 2015

(54) RESEARCH SYSTEM AND METHOD WITH RECORD BUILDER

(75) Inventors: John Duncan, Coral Gables, FL (US);
Ramon Caudet, South Miami, FL (US);
Carl W. Williams, Coral Gables, FL (US)

(73) Assignee: Datalaw, Inc., Miami, FL (US)

( * ) Notice: Subject to any disclaimer, the term of this patent is extended or adjusted under 35 U.S.C. 154(b) by 1623 days.

(21) Appl. No.: 11/854,314

(22) Filed: Sep. 12, 2007

(65) Prior Publication Data
US 2009/0070314 A1 Mar. 12, 2009

(51) Int. Cl.
G06F 17/00 (2006.01)
G06F 7/00 (2006.01)
G06F 17/30 (2006.01)

(52) U.S. Cl.
CPC .... G06F 17/30864 (2013.01); G06F 17/30595 (2013.01)

(58) Field of Classification Search
CPC ................... G06F 17/30867; G06F 17/30876; G06F 17/30595; G06F 17/30864
USPC ............................................................. 707/6
See application file for complete search history.

(56) References Cited

U.S. PATENT DOCUMENTS

| | | | |
|---|---|---|---|
| 4,658,370 A | 4/1987 | Erman et al. | 364/513 |
| 4,930,071 A | 5/1990 | Tou et al. | 364/300 |
| 5,103,498 A | 4/1992 | Lanier et al. | 395/68 |
| 5,257,185 A | 10/1993 | Farley et al. | 364/419.19 |
| 5,600,831 A | 2/1997 | Levy et al. | 395/602 |
| 5,644,686 A | 7/1997 | Hekmatpour | 395/50 |
| 5,794,236 A | 8/1998 | Mehrle | 707/5 |
| 5,799,268 A | 8/1998 | Boguraev | 704/9 |
| 5,822,745 A | 10/1998 | Hekmatpour | 706/59 |
| 5,953,718 A | 9/1999 | Wical | 707/5 |
| 6,038,560 A | 3/2000 | Wical | 707/5 |
| 6,236,994 B1 | 5/2001 | Swartz et al. | 707/6 |
| 6,256,627 B1 | 7/2001 | Beattie et al. | 707/6 |
| 6,292,792 B1 | 9/2001 | Baffes et al. | 706/45 |
| 6,446,061 B1 | 9/2002 | Doerre et al. | 707/3 |
| 6,498,795 B1 | 12/2002 | Zhang et al. | 370/400 |
| 6,668,255 B2 | 12/2003 | Mielenhausen | 707/100 |
| 6,711,585 B1 | 3/2004 | Copperman et al. | 707/104.1 |
| 6,993,534 B2 | 1/2006 | Denesuk et al. | 707/102 |
| 7,043,492 B1 | 5/2006 | Neal et al. | 707/101 |
| 7,099,854 B2 | 8/2006 | Liongosari | 706/45 |
| 7,194,454 B2 | 3/2007 | Hansen et al. | 707/3 |
| 7,209,913 B2 | 4/2007 | Megiddo et al. | 707/3 |
| 2002/0049705 A1 | 4/2002 | Haviv-Segal et al. | 707/1 |

(Continued)

*Primary Examiner* — Ann Lo
(74) *Attorney, Agent, or Firm* — Whitmyer IP Group LLC

(57) ABSTRACT

A system for providing relevant documents from a plurality of databases, including a search module for receiving at least one search expression, at least one managed database including a plurality of managed documents and a plurality of search records, each search record including at least one prior search expression associated with at least one of the plurality of managed documents, a plurality of unmanaged databases including a plurality of unmanaged documents, wherein the search module queries the managed database to determine at least one of the search records corresponding to the received search expression, and wherein the search module retrieves at least one of the managed documents associated with the determined search record. The search module may further query the plurality of unmanaged databases to determine one or more unmanaged documents corresponding to the at least one search expression and store the unmanaged document in the managed database.

25 Claims, 4 Drawing Sheets

(56) References Cited

U.S. PATENT DOCUMENTS

| | | |
|---|---|---|
| 2003/0115213 A1 | 6/2003 | Mielenhausen ............... 707/103 |
| 2003/0126117 A1 | 7/2003 | Megiddo et al. ................. 707/3 |
| 2005/0149343 A1 | 7/2005 | Rhoads et al. .................... 705/1 |
| 2005/0160056 A1 | 7/2005 | Hugh et al. ..................... 706/46 |
| 2005/0165764 A1 | 7/2005 | Liongosari ....................... 707/3 |
| 2005/0187839 A1 | 8/2005 | Butera et al. ................... 705/32 |
| 2006/0112053 A1 | 5/2006 | Jeanblanc et al. .............. 706/46 |
| 2006/0112085 A1 | 5/2006 | Zijlstra et al. .................... 707/3 |
| 2006/0179069 A1 | 8/2006 | Bechtel et al. ................ 707/100 |
| 2006/0224583 A1 | 10/2006 | Fikes et al. ......................... 707/6 |
| 2006/0294099 A1 | 12/2006 | Tsukamoto ....................... 707/7 |
| 2007/0081197 A1 | 4/2007 | Omoigui ....................... 358/403 |
| 2007/0106704 A1 | 5/2007 | Wolfe ........................... 707/201 |
| 2007/0112714 A1 | 5/2007 | Fairweather .................. 706/46 |
| 2007/0112759 A1 | 5/2007 | Kulakow et al. ................. 707/5 |

RESEARCH SYSTEM AND METHOD WITH RECORD BUILDER

FIELD OF THE INVENTION

The present invention relates generally to an information and document research system, and more particularly to a research system and method including a record builder for improving search accuracy and reducing redundancy.

BACKGROUND OF THE INVENTION

Various tools and search engines are known for searching data collections, such as the Internet. For example, Google, Yahoo, Alta Vista and others index the web. Other search tools, such as Lexis-Nexis and Westlaw, are known for performing research and searching specific types of databases via the Internet. However, larger and larger document collections are becoming available to search. The larger a data collection, the harder it is to perform a search and review the vast search results. This taxes both the relevancy ranking performed by the search engines and the search formulation skill of the users.

Furthermore, a particular user is often likely to perform the same or similar search again at a later date. With conventional search tools, the search must generally be repeated and the same search results reviewed again for relevancy. In an organization, such as a corporation or law firm, multiple users may likewise repeat the same or similar searches as one another. Each user therefore individually determines the relevancy of the search results without the benefit of prior search results or any relevancy determinations made by their colleagues. Document locations may also change and a relevant document may no longer be available at the time of a subsequent search.

Some systems and methods have been developed to optimize research and the searching of data collections. For example, U.S. Patent Application Publication No. 2005/0149343, entitled "Knowledge-management systems for law firms," discloses a system for searching documents located in a local document management system and documents in external databases. The system allows users to rate documents to indicate their quality. This assists the same or different user in determining whether a document is relevant and accurate when it is found in a subsequent search. However, the '343 publication does not disclose any means to review prior and/or related searches or any means to avoid redundant searches.

U.S. Patent Application Publication No. 2006/0224583, entitled "Systems and methods for analyzing a user's web history," discloses a system that allows users to view and analyze their search history. A user can browse or perform a search of their prior history. The user can view query terms from previous searches and links to search results that were accessed by the user. The search results are ranked by frequency of visit or by date. While the '583 publication discloses a means for a particular user to review his/her previous searches, the disclosed system does not assist with the accuracy and speed of future searches. Furthermore, while the system logs search results that were previously accessed by the user, there is no certainty that a result that was accessed was in fact considered to be relevant and useful. The system also only provides URL links to previously viewed results which may or may not still reside in their previous location.

What is desired therefore is a search tool and research system that overcomes the disadvantages in the prior art.

SUMMARY OF THE INVENTION

According, it is an object of the present invention to provide a search tool and research system that takes advantage of previous searches and search results to provide improve speed and accuracy. It is a further object of the present invention to provide such a system that allows multiple users, e.g., in the same organization, to benefit from one another's previous searches and relevancy determinations.

It is a further object of the present invention to provide a search tool and research system that includes a search record builder for storing and managing documents located and identified during a search. Knowledge bases are preferably built by saving documents and information from unmanaged databases. It is desired that the system allows users to build and continuously improve a knowledge base of the search records and relevant documents associated with each search.

These and other objects are achieved by providing a system for providing relevant documents from a plurality of databases including a search module for receiving at least one search expression, at least one managed database including a plurality of managed documents and a plurality of search records, each search record including at least one prior search expression associated with at least one of the plurality of managed documents, and a plurality of unmanaged databases including a plurality of unmanaged documents. The search module queries the at least one managed database to determine at least one of the search records corresponding to the at least one search expression, and the search module retrieves at least one of the managed documents associated with the determined search record.

The search module may further query the plurality of unmanaged databases to determine one or more unmanaged documents corresponding to the at least one search expression. The search module may also receive a user selection of one of the determined unmanaged documents, store the unmanaged document in the managed database, and associate the unmanaged document with the at least one search expression and at least one of the plurality of search records in the managed database.

Other objects of the present invention are achieved by provision of a method for providing relevant documents from a plurality of databases including the steps of receiving at least one search expression, querying one or more managed databases, the managed databases including a plurality of managed documents and a plurality of search records, each search record including at least one prior search expression associated with at least one of the plurality of managed documents, determining at least one of the search records corresponding to the at least one search expression, and retrieving at least one of the managed documents associated with the determined search record.

The method may also include the step of querying a plurality of unmanaged databases, the unmanaged databases including a plurality of unmanaged documents, and determining at least one of the unmanaged documents relevant to the at least one search expression. A user selection of at least one of the determined unmanaged documents may be received and the selected unmanaged document stored in the one or more managed databases.

In some embodiments, the method includes receiving at least one second search expression from a second user in an organization, wherein the first search expression is received from a first user in the organization, comparing the second search expression to the first search expression and the plurality of prior search expressions, and retrieving at least one managed document associated with the first search expression if the second search expression substantially corresponds to the first search expression, and retrieving at least one managed document associated with a prior search expression if the second search expression substantially corresponds to the prior search expression.

Further provided is a system for searching data collections including at least one database including a plurality of documents and a plurality of search records, each search record including one or more first search expressions each associated with at least one of the documents, a search module for receiving at least one second search expression, the search module determining at least one of the search records relevant to the second search expression and retrieving one or more of the documents associated with the determined search record, and wherein the search module is further for determining at least one of the plurality documents relevant to the second search expression and not associated with any one of the plurality of search records.

Further provided is a system for searching data collections including at least one managed database including a plurality of search records, each search record including one or more search expressions associated with one or more managed documents, at least one unmanaged database including a plurality of unmanaged documents, a search module for receiving at least one search expression, determining at least one of the search records relevant to the received search expression and retrieving one or more of the managed documents in the determined search record, wherein the search module further determines one or more of the unmanaged documents relevant to the received search expression, and a document management system for storing at least one of the determined unmanaged documents in the managed database and associating at least one of the determined unmanaged documents with the received search expression in the managed database. In some embodiments, the system includes a plurality of unmanaged databases wherein the search module translates the search expression for at least one of the plurality of unmanaged databases and simultaneously searches each of the plurality of unmanaged databases. In some embodiments, the managed database is a local database and the unmanaged database is a remote database.

Other objects, features and advantages according to the present invention will become apparent from the following detailed description of certain advantageous embodiments when read in conjunction with the accompanying drawings in which the same components are identified by the same reference numerals.

DETAILED DESCRIPTION OF THE INVENTION

Figure 1:
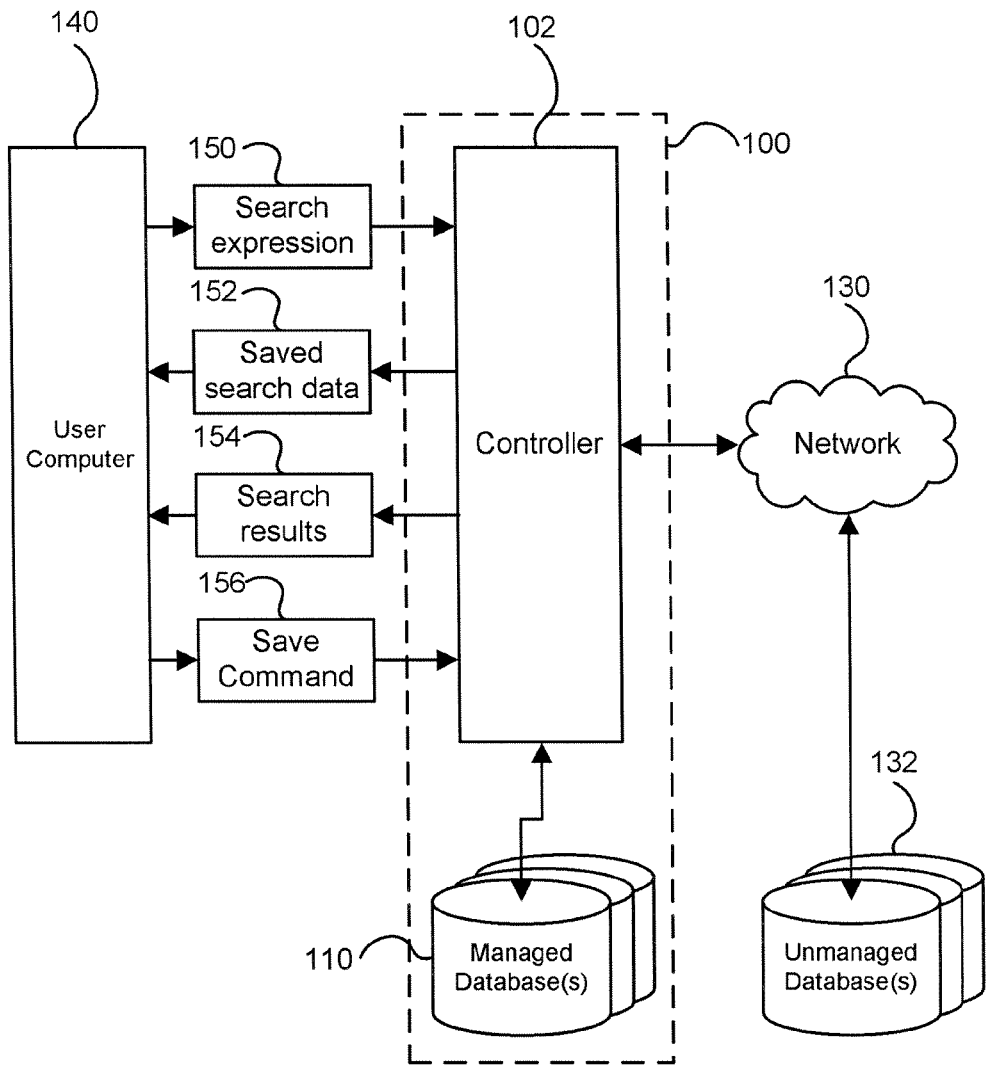
FIG. 1 is a schematic view of a system according to an exemplary embodiment of the present invention.

FIG. 1 illustrates a research system according to an exemplary embodiment of the present invention. As described herein, the system provides a means to search for relevant documents and information, e.g., to conduct research, answer questions or solve problems. Information related to search sessions and/or search expressions is stored for future reference by the same or different users. The system creates and continuously improves a knowledge based of search records and relevant documents associated with each search to speed and improve the accuracy of subsequent searches.

The system according to the present invention includes at least one controller 102. The controller 102 may be any device, system or part thereof that controls at least one operation and/or receives and executes software programs or processes. The controller 102 is preferably from the group consisting of digital signal processors, microcontrollers, and microprocessors, or the group consisting of field programmable gate arrays, and computer programmable logic devices. In some embodiments, the controller 102 is comprised in a system server 100. However, the functionality associated with the controller 102 may be centralized or distributed, whether locally or remotely or both.

The system further includes one or more, or a plurality of, managed databases 110 in communication with the controller 102. The managed databases 110 may include any database that is at least partially managed and/or organized by a document or records management system or application (e.g., 106), and/or by the research system according to the present invention. In some embodiments, the managed databases 110 include only those databases in which search records, as described herein, and documents associated with the search records and/or search expressions are stored.

The managed databases 110 may be comprised in the system server 100 or local thereto. For example, the managed databases 110 may be operated and controlled by a particular business organization and located at the organization's facility (e.g., local databases). However, managed databases 110 may also be located remote to the controller 102 and/or system server 100. For example, at least some managed databases 110 may be back-up or archive databases of an organization located in a remote location. Managed databases 110 may also be controlled or managed by a third party related or unrelated to the organization.

The controller 102 is also in communication with one or more, or a plurality of, unmanaged databases 132 or data sources. The unmanaged databases 132 may include any number of databases, sources and/or search engines that are not managed or organized by a document or records management system. The unmanaged databases 132 may also include databases organized or managed by a means other than the system according to the present invention. For example, in a legal organization setting the unmanaged databases 132 may include databases such as Lexis-Nexis, West Group, and Google.

In the exemplary embodiment, the unmanaged databases 132 include a plurality of databases and sources accessible via a network 130 (e.g., Internet, an intranet, a local area network, a wide area network) or otherwise accessible by the system. For example, the unmanaged databases 132 may include the entirety of Internet accessible databases (e.g., websites, remote databases, etc), a substantial portion thereof, and/or subsets of Internet accessible material (e.g., determined by the user or system).

The unmanaged databases 132 may also include local databases that have not yet been managed or organized. For example, the unmanaged databases 132 may include a database of unmanaged legacy data, archived data or any other unmanaged data of a computer, group of computers, network and/or organization. The system according to the present invention may therefore be used to organize and manage such unmanaged data and store it in a different managed database or, in some embodiments, the same database. In the latter embodiments, the unmanaged database and managed database may be one in the same.

The system of the present invention includes any number of users having access to the controller 102 and/or databases 110/132 via user computers 140. In the exemplary embodiment, each of the users is a member of the same organization or group. For example, the users may be employees of a particular business organization or law firm. The users may also be members of the same group such as a group of subscribers to a knowledge base or research service. Preferably at least some of the users have common research interests and/or goals so that one another's prior searches or identifications of relevant documents are useful to one another. It is not however required that the users be members of the same group or organization and, in some embodiments, the users are unrelated in association and/or interests.

As shown in FIG. 1, a user may submit a search expression 150 and/or group of search terms to the controller 102. A search expression 150 may include, e.g., one or more search terms or a string a search terms. The search expression 150 is provided via a user computer 140 by means of a user interface of the system (e.g., browser based user interface). The controller 102 may then provide saved search data 152 related to the search expression 150. As will be described in more detail below, the system attempts to determine one or more search records—indicative of prior searches by the same or a different user—that are relevant to the search expression 150 (e.g., searches that employed the same or similar search expressions). Relevant search records, and/or information and documents stored or associated therewith, are then provided to the user that initiated the search. For example, the search record may be displayed to the user via the user interface.

If no relevant search records are found, or if the documents or information sought by the user is not located in existing search records, a search of the unmanaged databases 132 may be commenced. The system searches a plurality of unmanaged databases 132 and/or search engines simultaneously to find new search results related to the search expression. Prior to or during the search, the system (e.g., via the search module 104) may translate and/or normalize the search expression as necessary to accommodate for differences in each of the unmanaged databases or search engines. For example, the system may adjust grammar, language, terms, and/or connectors of search expressions in accordance with particular rules, requirements, or procedures associated with a particular source. This allows the system according to the present invention to simultaneously search any number of difference sources and consistently provide meaningful search results from each. The controller 102 may then provide the user with new search results 154, e.g., indicatively of newly located documents, information or web pages (e.g., in the unmanaged databases 132).

The user may, in some instances, choose to indicate that a particular document in the search results 154 is relevant and save the document. As such, the controller 102 receives a selection or save command 156 from the user. This enables the user to save relevant documents with one click during the search session. Documents are preferably converted and saved in the managed database 110 in a common file format (e.g., pdf, mht). The relevant documents are linked or associated with the search expression 150 in the managed database 110, i.e., in a search record. As will be understood further from the following description, relevant documents are associated with the search expressions and terms (or keywords) that are chosen by the users prior to locating the relevant documents. Therefore, the present invention is unlike and in some respects opposite to traditional indexing systems (e.g., Westlaw, Lexus) in which a finite number keywords are assigned to documents that may later be searched. This unique approach provides a user driven research system that continuously evolves and improves. When the system is employed by a group of trusted users in a particular organization, the search records become increasing relevant to the business of the organization over time.

Figure 2:
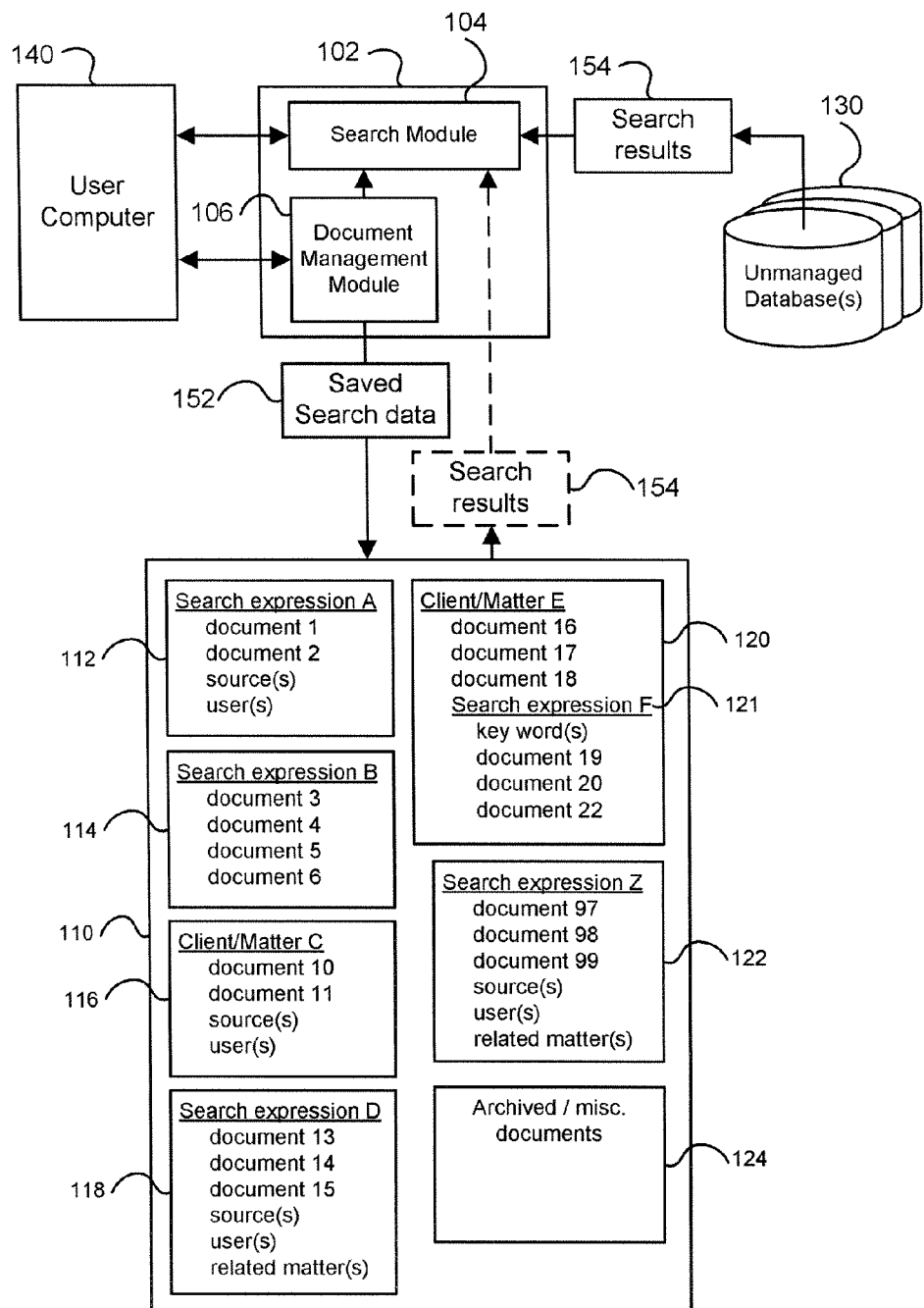
FIG. 2 is another schematic view of the system shown in FIG. 1.

FIG. 2 shows another view of the system according to an exemplary embodiment of the present invention. The controller 102 includes, or otherwise has access to, one or more search modules 104 or applications for receiving search expressions 150 and determining whether any search records (e.g., 112, 114, 116, 118, 121, 122) in the managed database 110 are relevant to the received search expression 150. For example, a search record may be relevant if it includes the same search expression 150 or a similar search expression 150 (e.g., including one or more of the same or similar search terms). In some embodiments, the system also includes a relevancy factor and/or filter (e.g., set by a system administrator) for determining a scale of relevancy. The controller 102 also includes, or otherwise has access to, a document management module 106 or application for storing and/or profiling documents, search records, clients and/or matters and associations between the same.

If a relevant search record is found, the system suggests or provides the user with access to the search record and/or the documents and information stored therein. By the system searching prior and/or existing search records, the system first returns only documents that have been previously saved under the same or similar search expression (e.g., by the user or another in his/her organization). Since these documents have already been declared relevant to the same or similar search expression by at least one user, the probability that the current user will want any one of the returned documents is much higher than in a new search (e.g., Google search). After reviewing the saved documents and information relevant to the search expression 150, the use may also proceed with a search of the unmanaged databases 132 to continue or update the prior search.

In preferred embodiments, if the user's search expression 150 is the same as in an existing search record (i.e., from a prior search), the system may require that the user continue from the existing search record rather than creating a new substantially identical search record. This ensures that similar research is consolidated in the knowledge base and limits redundancy. By subsequent users begin where others left off, the search records continuously evolve and improve.

As shown in FIG. 2, the managed databases 110 include any number of search records (e.g., 112, 114, 118, 121, 122) with associated documents. Each document may have a document profile that is stored within or linked to the one or more search records and/or search expressions to which it pertains. Search records, and/or the document profiles therein, may include other information concerning the search or document, such as sources of the document(s) (e.g., Internet domains), storage location, the user or users who performed or continued the search, search and/or document dates, cross references to related matters or clients, document summaries and/or text, and any number of keywords. Keywords may include, e.g., search terms including the search expression 150 or related keywords entered into the search record by a user (e.g., related to the search and/or a particular document). A search record may further include any number of record instances created and/or update each time the search record is accessed by a user (e.g., whether or not a new document is stored). The record instances thus provide an activity history in each search record that may be viewed and/or exported by subsequent users.

A search record may also be associated with one or more client and matters in the managed database 110 or, in some embodiments, stored within a data record associated with one client and/or matter (e.g., 120). In some embodiments, the system also automatically tracks and stores time and costs associated with research work for billing purposes. Research histories, including time and billing information, can be easily accessed and printed. The managed databases 110 may further include at least some unmanaged documents or information 124.

In some embodiments, the search records may be browsed and/or viewed in a knowledge base table or other format via a user interface generated by the system. For example, a user may browse the various search records by search expression, categories and sub-categories of search expressions, associated client/matters, etc. Search records may also be browsed by business units or areas in the knowledge base table. For example, in a law firm setting some search records may be associated with one or more areas of practice and users can browse by particular practice area. By selecting a given search record, the user may view the documents and information stored therein and/or chose to continue or update the selected search record. In some embodiments, a user or users who previous performed the same or similar search, or users that have subscribed to a particular search record or knowledge base, are notified or alerted of any updates or continuations of the search (e.g., via email or other means).

Figure 3:
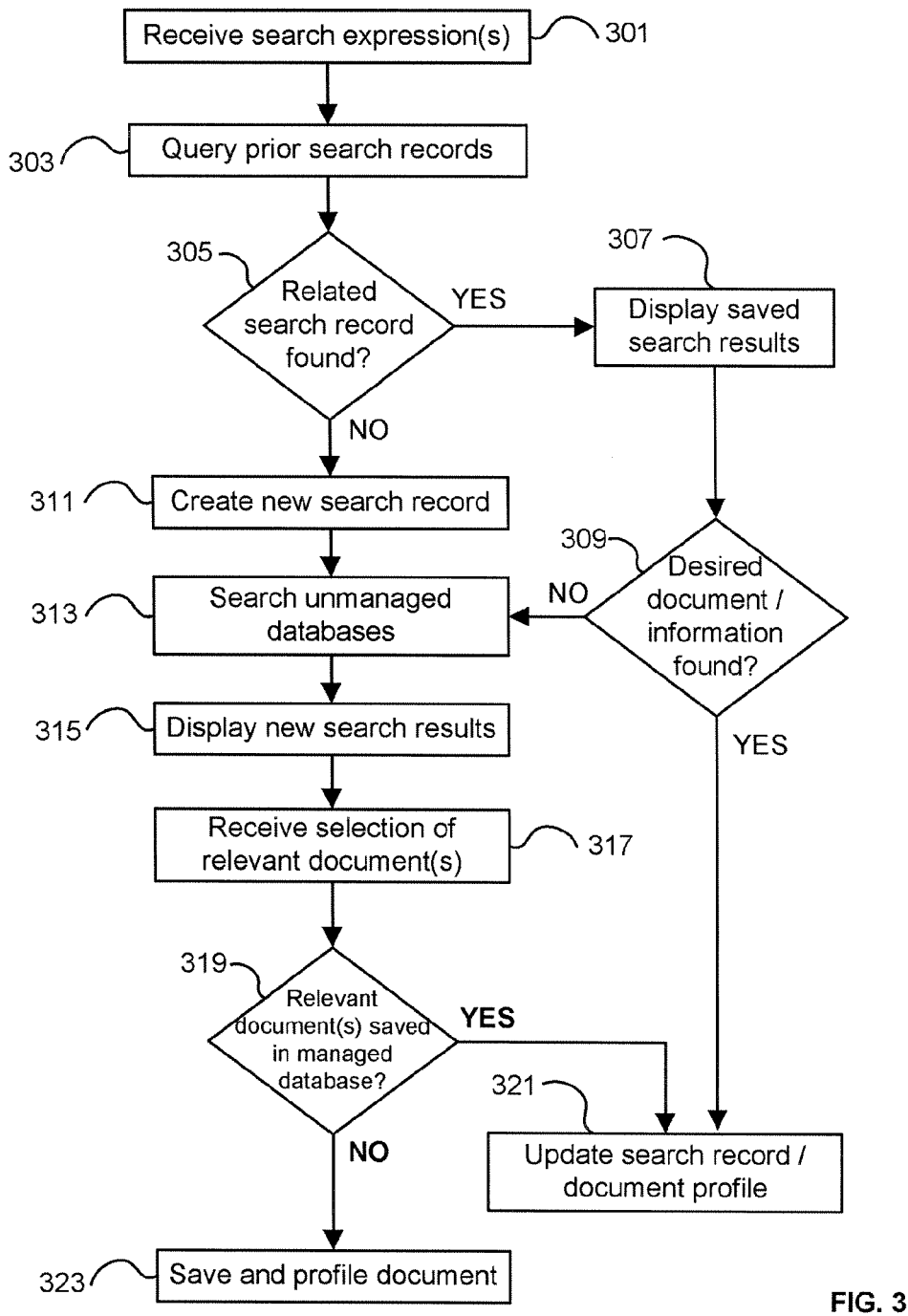
FIG. 3 illustrates a method for providing relevant documents from a plurality of databases employable by the system shown in FIG. 1.

FIG. 3 illustrates an exemplary method for providing relevant documents from a plurality of databases employable by the system according to the present invention. The method includes a step of receiving one or more search expressions from a user (step 301). Any number of search records, e.g., stored in a managed database 110, are searched to determine whether any prior related searches have been performed by the same or a different user (step 303-305). If a related and/or relevant search record is found, the user is presented with the search record and/or the documents and information therein (step 307).

The user may then review the saved documents that were previously determined to be relevant to the same or similar search expression. If the information and/or document(s) desired by the user is found, the user may stop searching and the system may update the search record if necessary (e.g., create/update a record instance). If the document or information desired by the user is not found in any search records returned by the system (step 309), the system executes a search of unmanaged databases (step 313). Likewise, if no related or relevant search records were found, the system creates a new search record for the given search expression and begins a search of the unmanaged databases (step 311-313). For example, the system may execute an Internet search of a plurality of internet accessible databases and data sources.

The search results are displayed or otherwise provided to the user and the user may select any number of the documents as relevant for saving (steps 315-317). Prior to saving the selected document, the system may first determine whether the document already exists in a managed database (step 319). For example, the same document may already be stored and associated with a different search or a particular client or matter. If the document is found to already reside in the managed database 110, the search and/or document profile is updated to also associate the document with the present search record (step 321). A record instance may also be created and/or updated. If the selected document is not found in the managed databases 110, it is saved and profiled in a managed database (step 323). The selected document is saved in or associated with the search record and/or search expression continued by the user or the new search record created upon finding no relevant search records. In a preferred embodiment, each document is saved in one or more common file formats (e.g., pdf, mht).

Figure 4:
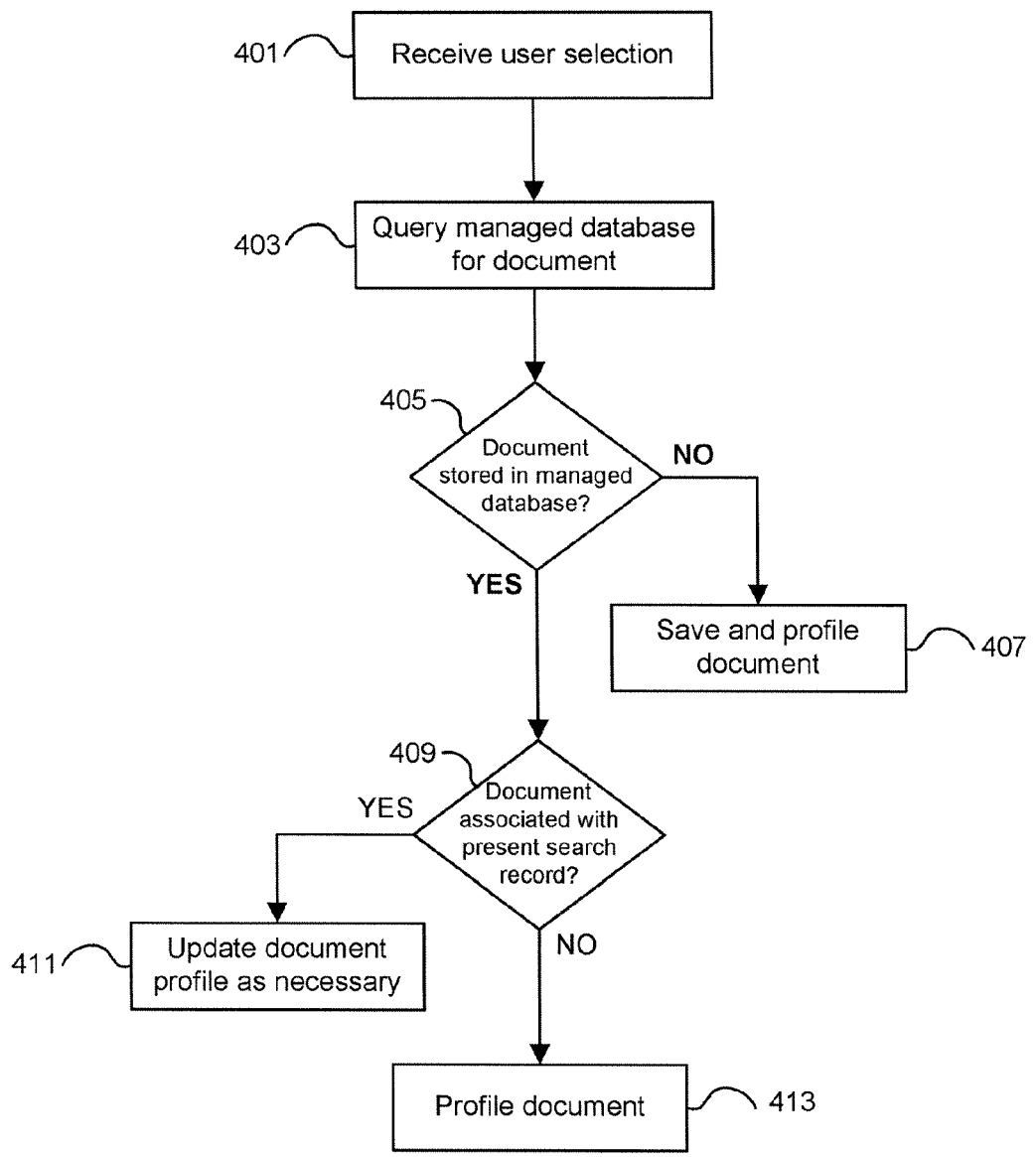
FIG. 4 is illustrates a method for storing a document employable by the system shown in FIG. 1.

FIG. 4 further illustrates the method for storing a document employable by the system. It should be understood however that other methods may also be employed by the system. For example, in some embodiments, all selected documents are stored and profiled regardless of whether a duplicate document already exists in the managed database.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for providing relevant documents from a plurality of databases, comprising:
at least one processor;
a search module executing on said processor for receiving at least one search expression via a user computer and executing one or more searches according to the received search expression;
at least one managed database including a plurality of managed documents previously identified in search results by said search module in one or more prior searches executed by said search module, each of said managed documents having been selectively chosen by a user from the search results for storage in said managed database upon the one or more prior searches, said at least one managed database further including a plurality of search records including one or more prior search expressions, wherein each of the managed documents is associated in said managed database with at least one of the prior search expressions used to identify such managed document in at least one of the prior searches;
a plurality of unmanaged databases including a plurality of unmanaged documents;
wherein said search module comprises software for searching the at least one managed database to identify at least one of the prior search expressions corresponding to the at least one received search expression and retrieving at least one of the managed documents associated with the identified prior search expression from, said managed database;
wherein said search module further comprises software for searching said plurality of unmanaged databases to identify one or more unmanaged documents corresponding to the at least one received search expression, receiving a user selection of at least one of the unmanaged documents associated with the at least one received search expression, and storing the at least one of the unmanaged documents associated with the received search expression in said at least one managed database.

2. The system according to claim 1, wherein said search module associates the unmanaged document with the at least one received search expression.

3. The system according to claim 1, wherein each search record further includes data indicative of at least one user associated with the search record.

4. The system according to claim 1, wherein said managed database further includes a document profile record for each of the managed documents, wherein the document profile record includes data indicative of at least one source of the managed document.

5. The system according to claim 4, wherein the source includes one of the unmanaged databases.

6. The system according to claim 1, further comprising:
a document management system for managing the plurality of search records and managed documents in the managed database, wherein one or more of the search records is associated with at least one matter by the document management system.

7. A method for providing relevant documents from a plurality of databases, comprising the steps of:
receiving at least one search expression via a user computer;
querying one or more managed databases using a search module executing on a processor, the managed databases including a plurality of managed documents previously identified in search results by the search module in one or more prior searches executed by the search module, each of said managed documents having been selectively chosen from the search results by a user for storage in said managed database by a user upon the one or more prior searches, the managed databases further including a plurality of search records including at least one prior search expression, wherein each of the managed documents is associated in said managed database with at least one of the prior search expressions used to identify such managed document in at least one of the prior searches;
identifying at least one of the prior search expressions corresponding to the at least one received search expression;
retrieving at least one of the managed documents associated with the identified search expression from said managed database.

8. The method according to claim 7, wherein said step of querying the managed databases includes comparing the at least one search expression to the prior search expressions.

9. The method according to claim 7, further comprising the steps of:
querying a plurality of unmanaged databases, the unmanaged databases including a plurality of unmanaged documents; and
determining at least one of the unmanaged documents relevant to the at least one search expression.

10. The method according to claim 9, further comprising the steps of:
receiving a user selection of at least one of the determined unmanaged documents via the user computer;
storing the selected unmanaged document in the one or more managed databases.

11. The method according to claim 10, wherein said step of storing includes associating the selected unmanaged document with the received search expression and one of the plurality of search records.

12. The method according to claim 10, wherein said step of storing includes determining whether the managed databases comprise the selected unmanaged document.

13. The method according to claim 10, wherein a substantial portion of the managed documents have a common file format, wherein the selected unmanaged document is stored in the common file format.

14. The method according to claim 9, further comprising the steps of:
creating a new search record; and storing at least a portion of the determined unmanaged documents together with the at least one search expression in the new search record.

15. The method according to claim 7, wherein one or more of the search records are associated with one or more matters in the managed databases.

16. The method according to claim 7, wherein the at least one search expression includes one or more search terms, wherein the determined search record includes at least a predetermined number of the one or more search terms.

17. The method according to claim 7, further comprising the steps of:
receiving at least one second search expression from a second user in an organization via a second user computer, wherein the first search expression is received from a first user in the organization;
comparing the second search expression to the first search expression and the plurality of prior search expressions; and
retrieving at least one managed document associated with the first search expression if the second search expression substantially corresponds to the first search expression; and
retrieving at least one managed document associated with a prior search expression if the second search expression substantially corresponds to the prior search expression.

18. A system for searching data collections, comprising:
at least one database including a plurality of documents, wherein at least a portion of said documents were previously identified in search results by a search module in one or more prior searches executed by said search module, each of the at least a portion of said documents having been selectively chosen from the search results by a user for storage in said database by a user upon the one or more prior searches, said database further comprising a plurality of search records including one or more first search expressions, wherein each of the at least a portion of said documents is associated in said database with at least one of the first search expressions used to identify such document in at least one of the prior searches;
at least one processor;
said search module executing on said processor for receiving at least one second search expression via a user computer, said search module determining at least one of the search records relevant to the second search expression and retrieving one or more of the at least a portion of said documents associated with the determined search record from said at least one database; and
wherein said search module is further for determining at least one of the plurality documents relevant to the second search expression and not associated with any one of the plurality of search records.

19. The system according to claim 18, wherein the at least one database includes at least one managed database and at least one unmanaged database, wherein the managed database includes each of the plurality of search records and each of the plurality of documents that are associated with at least one search record.

20. The system according to claim 19, wherein the unmanaged database includes each of the plurality of documents that are not associated with any one of the plurality of search records.

21. A system for searching data collections, comprising:
at least one managed database including a plurality of search records indicative of prior searches, each search record including one or more search expressions associated with one or more managed documents previously identified in search results by a search module in one or more prior searches executed by said search module, said managed documents having been selectively chosen from the search results by a user for storage in said managed database by a user upon the one or more of the prior searches, wherein each of the managed documents is associated in said managed database with at least one of the prior search expressions used to identify such managed document in at least one of the prior searches;

at least one unmanaged database including a plurality of unmanaged documents;

at least one processor;

said search module executing on said processor comprising software for receiving at least one search expression via a user computer, determining at least one of the search records relevant to the received search expression and retrieving one or more of the managed documents in the determined search record, wherein said search module further comprises software for identifying one or more of the unmanaged documents relevant to the received search expression; and a document management system for storing at least one of the determined unmanaged documents in the managed database and associating at least one of the determined unmanaged documents with the received search expression in the managed database.

22. The system according to claim 21, wherein each of the search records and plurality of first documents are accessible via said document management system.

23. The system according to claim 21, wherein the at least one unmanaged database includes a plurality of unmanaged databases;

wherein said search module translates the search expression for at least one of the plurality of unmanaged databases; and wherein the search module simultaneously searches each of the plurality of unmanaged databases.

24. The system according to claim 21, wherein the at least one determined unmanaged document is stored upon receipt of a user selection of the at least one determined unmanaged document.

25. The method according to claim 7, further comprising the steps of:

associating the at least one search expression received by the user computer with the at least one managed document in the managed database, such that the at least one managed document is associated with two or more search expressions in the managed database.

* * * * *